Patented May 23, 1950

2,508,726

UNITED STATES PATENT OFFICE 2,508,726

PRECIPITATION OF MANNOGALACTANS AND GLUCOMANNANS FROM AQUEOUS SOLS

Paul E. Ramstad, St. Paul, and Charles A. Anker, Minneapolis, Minn., assignors to General Mills, Inc., a corporation of Delaware No Drawing. Application June 27, 1946, Serial No. 679,862

5 Claims. (Cl. 260—209)

The present invention relates to a process of precipitating mannogalactans and glucomannans from alkaline borate gels, and is particularly applicable to the purification of mannogalactans and glucomannans by this method.

The endosperms of many leguminous seeds are comprised largely of mannogalactan type polysaccharides. Seeds such as locust bean, guar, honey locust, palo verde, tara, etc., contain this type polysaccharide and are useful as a source of this type material. Glucomannans are found chiefly in the corms of plants of the Amorphophallus species, such as *Amorphophallus rivieri*. While the endosperm of these seeds and the corms of the Amorphophallus plants consist chiefly of water-dispersible gums, they also contain other non-dispersible materials which are chiefly cellulosic in nature and which settle out of a dilute aqueous sol of the gum. Previously gums of this type have been purified by dispersing the gum in the form of a dilute aqueous sol and then filtering off or centrifuging off the insoluble material, after which the gum is recovered either by precipitating it by the addition of large volumes of alcohol or by evaporating off the water to leave the gum as a residue. Both of these prior methods of recovering the gum have been cumbersome and expensive. It has now been discovered, however, that it is possible to form a gel of the dilute aqueous sol and to precipitate the gum from the sol by means of inexpensive materials.

It is, therefore, an object of the present invention to provide a process of purifying mannogalactans and glucomannans by dispersing them in dilute aqueous sols, causing the sols to gel precipitating the gum from the gel and recovering the gum.

In general, the invention involves the discovery that aqueous sols of mannogalactan and glucomannan gums may be precipitated by adding calcium, magnesium, or cupric salts to the aqueous sols and then rendering the sols alkaline until a gel is formed which synereses on the further addition of alkali. The precipitated gum may then be recovered and purified. Frequently copper, magnesium or calcium hydroxides precipitate along with the gum under the reaction conditions and these may be removed in any suitable way; for example, the materials may be suspended in water, acidified with strong mineral acid to form a thick paste, which may then be dialyzed to remove the inorganic salts present. As an alternative, the precipitated gum may be suspended in alcohol, acidified with strong mineral acid to dissolve the inorganic material, after which the insoluble gum may be collected and filtered and then dried.

In general the invention is applicable to any of the above seeds in a variety of different forms. Thus it is possible to isolate the endosperm from the remainder of the seed and then subject the endosperm to the herein described purification process. As an alternative, it is also possible to subject a less pure product to purification. For example, the broken whole seed, or endosperm particles with or without seed coat attached, and with or without embryo may be used. Any undispersed material will be removed by filtration or centrifuging of the sol. The use of isolated endosperm is preferred, however, as the other starting materials contain coloring and other water soluble materials which will contaminate the resultant gum product, and are difficult to remove. The glucomannans are usually available in the form of a flour derived by drying and grinding the corms of the Amorphophallus plants.

In carrying out the process, it is preferred to grind the starting material to a reasonable degree of fineness so as to permit ready dispersion. Coarser particles may be used, but they will necessitate soaking for a considerable period of time before they have swelled enough to be thoroughly dispersed.

The starting material is then dispersed in water. To obviate filtering and centrifuging difficulties, it is preferred to prepare low concentration sols such as below about 2%. Concentrations as low as 0.5% have been found very advantageous. When the gum has been suitably dispersed, the resulting sol is then clarified by filtering, centrifuging, or settling. The inorganic salts are then added in the manner hereinafter decribed to precipitate the gum which may then suitably be separated, washed, and dried.

EXAMPLE 1

A clarified sol containing 2.5 g. of guar gum dispersed in 500 ml. of water was treated with 0.04 g. cupric chloride. The sol was rapidly stirred and 22 ml. of a 5% solution of sodium hydroxide was slowly added to it. The addition of the sodium hydroxide first caused a gel formation. This gel synersed upon continued addition of the sodium hydroxide solution. The precipitate thus formed was collected by centrifuging. A portion of the precipitate was resuspended in water acidified with hydrochloric acid to form a thick paste which was dialyzed to remove the copper salts present. The remainder of the precipitate was suspended in alcohol acidified with hydrochloric acid to dissolve the copper salts. The precipitate was collected by filtering and then dried. The product was readily dispersible in water acidified sufficiently to neutralize the residual alkalinity of the precipitated product, to produce a clear sol.

EXAMPLE 2

A clarified sol containing 5 g. of guar gum dispersed in 500 ml. of water was treated with 5 g. of calcium chloride. The addition of sodium hydroxide caused gel formation followed by syneresis to precipitate the gum along with some insoluble calcium hydroxide. A total of 32 ml. of 5% sodium hydroxide solution were required for the precipitation of the gum. The precipitate was collected by centrifuging and dried. This material was found to possess 12.2% ash indicating that a considerable amount of calcium salts were present with the gum. These calcium salts may be readily removed in the manner previously described to produce a gum which is readily dispersible in water acidified sufficiently to neutralize the residual alkalinity of the precipitated product, to produce a clear sol.

Considerable variation is possible in the various factors involved in the invention. Thus the concentration of the reagents and the sol may be varied considerably. In general, however, a sol of higher concentration requires a greater electrolyte concentration to cause precipitation than does a more dilute sol. This may be demonstrated by comparing the amount of reagents required to precipitate the gum from 500 ml. of 0.5% and 1.0% guar gum sols using cupric chloride and sodium hydroxide.

*Precipitation with cupric chloride and sodium hydroxide*

| 0.5% Sol | | 1.0% Sol | |
|---|---|---|---|
| $CuCl_2$ g. | 5% NaOH, ml. | $CuCl_2$ g. | 5% NaOH, ml. |
| 0.03 | *>100 | 0.06 | †>100 |
| 0.04 | 22 | 0.07 | 60 |
| 0.05 | 14 | 0.08 | 42 |

*No syneresis.
†Slight syneresis.

*Precipitation with calcium chloride and sodium hydroxide*

| 0.5% Sol | | 1.0% Sol | |
|---|---|---|---|
| $CaCl_2$, g. | 5% NaOH, ml. | $CaCl_2$, g. | 5% NaOH, ml. |
| 1.0 | 74 | 2.0 | *>100 |
| 2.0 | 40 | 5.0 | 32 |
| 5.0 | 28 | | |

*Slight syneresis.

Any water soluble calcium, magnesium or cupric salt may be used for addition to the aqueous sol. Likewise almost any relatively strong alkali material may be used to precipitate the gum. Thus sodium or potassium hydroxide, carbonate, phosphate, borate, or the like may be used for this purpose. The amount of alkaline material employed may depend on the nature of the alkaline material.

It will be seen, therefore, that the present invention provides a novel process of purifying mannogalactan and glucomannan gums and permits their recovery in a substantially pure form in an inexpensive way.

While various modifications of the invention have been described, it is to be understood that the invention is not limited thereto, but may be varied within the scope of the following claims.

We claim as our invention:

1. Process of purifying a gum selected from the group consisting of mannogalactans and glucomannans which comprises dispersing the gum in water to make an aqueous sol, removing insoluble material from the sol to produce a clarified sol, adding a water soluble salt of a metal selected from the group consisting of calcium, magnesium and copper, then adding a relatively strongly alkaline material to the sol to precipitate the gum and separating the precipitated gum from the water.

2. Process of purifying a gum selected from the group consisting of mannogalactans and glucomannans which comprises dispersing the gum in water to make an aqueous sol, removing insoluble material from the sol to produce a clarified sol, adding a water soluble salt of a metal selected from the group consisting of calcium, magnesium and copper, then adding a relatively strongly alkaline material to the sol to precipitate the gum, separating the precipitated gum from the water, suspending the precipitated gum in an organic solvent in which it is insoluble, extracting inorganic material from the suspension by means of a strong mineral acid and recovering the gum.

3. Process of purifying a gum selected from the group consisting of mannogalactans and glucomannans which comprises dispersing the gum in water to make an aqueous sol, removing insoluble material from the sol to produce a clarified sol, adding a water soluble copper salt, then adding a relatively strongly alkaline material to the sol to precipitate the gum and separating the precipitated gum from the water.

4. Process of purifying a gum selected from the group consisting of mannogalactans and glucomannans which comprises dispersing the gum in water to make an aqueous sol, removing insoluble material from the sol to produce a clarified sol, adding a water soluble salt of a metal selected from the group consisting of calcium, magnesium and copper, then adding an alkali metal hydroxide to the sol to precipitate the gum and separating the precipitated gum from the water.

5. Process of purifying a gum selected from the group consisting of mannogalactans and glucomannans which comprises dispersing the gum in water to make an aqueous sol, removing insoluble material from the sol to produce a clarified sol, adding a water soluble copper salt to the clarified sol, and then adding an alkali metal hydroxide to the sol to precipitate the gum, separating the precipitated gum from the water, suspending the precipitated gum in an organic solvent in which it is insoluble, extracting inorganic material from the suspension by means of a strong mineral acid and recovering the gum.

PAUL E. RAMSTAD.
CHARLES A. ANKER.

REFERENCES CITED

The following references are of record in the file of this patent:

UNITED STATES PATENTS

| Number | Name | Date |
|---|---|---|
| 2,073,616 | Acree | Mar. 16, 1937 |
| 2,382,286 | Blihovde | Aug. 14, 1945 |

OTHER REFERENCES

Hart, Ind. Eng. Chem. Anal. Ed., v. 2 (1930), pp. 330–331, 2 pages.